US009578131B2

(12) United States Patent
Xu et al.

(10) Patent No.: US 9,578,131 B2
(45) Date of Patent: Feb. 21, 2017

(54) VIRTUAL MACHINE MIGRATION BASED ON COMMUNICATION FROM NODES

(71) Applicant: Empire Technology Development LLC, Wilmington, DE (US)

(72) Inventors: Shijie Xu, Haidian District (CN); Qi Li, Haidian District (CN); Xuefeng Song, Shijiazhuang (CN)

(73) Assignee: Empire Technology Development LLC, Wilmington, DE (US)

( * ) Notice: Subject to any disclaimer, the term of this patent is extended or adjusted under 35 U.S.C. 154(b) by 74 days.

(21) Appl. No.: 14/439,987

(22) PCT Filed: Jun. 12, 2014

(86) PCT No.: PCT/CN2014/079736
§ 371 (c)(1),
(2) Date: Apr. 30, 2015

(87) PCT Pub. No.: WO2015/188346
PCT Pub. Date: Dec. 17, 2015

(65) Prior Publication Data
US 2016/0248883 A1    Aug. 25, 2016

(51) Int. Cl.
*G06F 9/48* (2006.01)
*H04L 29/08* (2006.01)
*H04L 12/931* (2013.01)

(52) U.S. Cl.
CPC ........... *H04L 67/327* (2013.01); *G06F 9/4856* (2013.01); *H04L 49/70* (2013.01); *H04L 67/148* (2013.01)

(58) Field of Classification Search
CPC ............................ G06F 9/4856; G06F 9/5088
See application file for complete search history.

(56) References Cited

U.S. PATENT DOCUMENTS 7,761,573 B2 * 7/2010 Travostino ............ G06F 9/4856
709/226
7,788,411 B2 * 8/2010 Belgaied ............. H04L 12/4679
709/226

(Continued)

FOREIGN PATENT DOCUMENTS

| CN | 102929715 A | 2/2013 |
| CN | 103516620 A | 1/2014 |
| WO | 2013099019 A1 | 7/2013 |

OTHER PUBLICATIONS

International Search Report and Written Opinion for International Application No. PCT/CN2014/079736, mailed on Mar. 13, 2015, 10 pages.

(Continued)

*Primary Examiner* — Arvin Eskandarnia
(74) *Attorney, Agent, or Firm* — Moritt Hock & Hamroff LLP; Steven S. Rubin, Esq.

(57) ABSTRACT

Technologies are generally described for systems, devices and methods effective to migrate a virtual machine between computing devices. A first and second node may be identified effective to access the virtual machine at a first computing device. First and second vectors related to the first and second nodes, respectively, may be determined. The first and second vectors may relate to values of a parameter. The parameter may relate to communication between the nodes and the first computing device. The vectors may form a distribution. A feature of the distribution of the vectors may be determined. A first magnitude between the first computing device and the feature may be determined. A second magnitude between the second computing device and the feature may be determined. The virtual machine may be migrated from the first computing device to the second computing device if the second magnitude is less than the first magnitude.

20 Claims, 5 Drawing Sheets

(56) References Cited

U.S. PATENT DOCUMENTS

| | | | |
|---|---|---|---|
| 8,352,942 B2 | 1/2013 | Shimogawa | |
| 2006/0206300 A1* | 9/2006 | Garg | G06F 9/45537 703/27 |
| 2007/0198656 A1* | 8/2007 | Mazzaferri | G06F 3/1415 709/218 |
| 2008/0163207 A1* | 7/2008 | Reumann | H04L 63/0263 718/1 |
| 2008/0222375 A1* | 9/2008 | Kotsovinos | G06F 9/5083 711/162 |
| 2008/0270564 A1* | 10/2008 | Rangegowda | G06F 9/5088 709/212 |
| 2009/0172125 A1* | 7/2009 | Shekhar | G06F 11/2025 709/215 |
| 2009/0199177 A1* | 8/2009 | Edwards | G06F 9/5077 718/1 |
| 2009/0240790 A1* | 9/2009 | Utsunomiya | H04L 12/4645 709/221 |
| 2009/0300605 A1* | 12/2009 | Edwards | G06F 9/5077 718/1 |
| 2010/0131636 A1* | 5/2010 | Suri | H04L 45/00 709/224 |
| 2010/0153514 A1* | 6/2010 | Dabagh | G06F 13/4022 709/213 |
| 2011/0246669 A1* | 10/2011 | Kanada | G06F 9/4856 709/238 |

OTHER PUBLICATIONS

Jalaparti, V., et al., "SMOG: A Cloud Platform for Seamless Wide Area Migration of Online Games," NetGames '12 Proceedings of the 11th Annual Workshop on Network and Systems Support for Games, Article No. 9, pp. 1-6 (2012).

Tarighi, M., et al., "A new model for virtual machine migration in virtualized cluster server based on Fuzzy Decision Making," Journal of Telecommunicatins, vol. 1, Issue 1, pp. 40-51 (Feb. 2010).

Wood, T., et al., "Black-box and Gray-box Strategies for Virtual Machine Migration," Proceeding NSDI'07 Proceedings of the 4th USENIX conference on Networked systems design & implementation, pp. 1-14 (2007).

Zhang, W., et al., "LVMCI: Efficient and Effective VM Live Migration Selection Scheme in Virtualized Data Centers," IEEE 18th International Conference on Parallel and Distributed Systems (ICPADS), pp. 368-375 (Dec. 17-19, 2012).

* cited by examiner

400 A computer program product.

402 A signal bearing medium.

404

At least one of

One or more instructions for migrating a virtual machine from a first computing device to a second computing device; or One or more instructions for identifying a first node configured to access the virtual machine at the first computing device; or One or more instructions for determining a first vector related to the first node, wherein the first vector relates to a first value of a parameter, and the parameter relates to communication between the first node and the first computing device; or One or more instructions for identifying a second node configured to access the virtual machine at the first computing device; or One or more instructions for determining a second vector related to the second node, wherein the second vector relates to a second value of the parameter, the parameter further relates to communication between the second node and the first computing device, and further wherein the first and second vectors form a distribution; or One or more instructions for determining a feature of the distribution of the first and second vectors; or One or more instructions for determining a first magnitude between the first computing device and the feature based on the parameter; or One or more instructions for determining a second magnitude between the second computing device and the feature based on the parameter; or One or more instructions for migrating the virtual machine from the first computing device to the second computing device in response to a determination that the second magnitude is less than the first magnitude.

| 406 A computer readable medium | 408 A recordable medium | 410 A communications medium |

Fig. 4

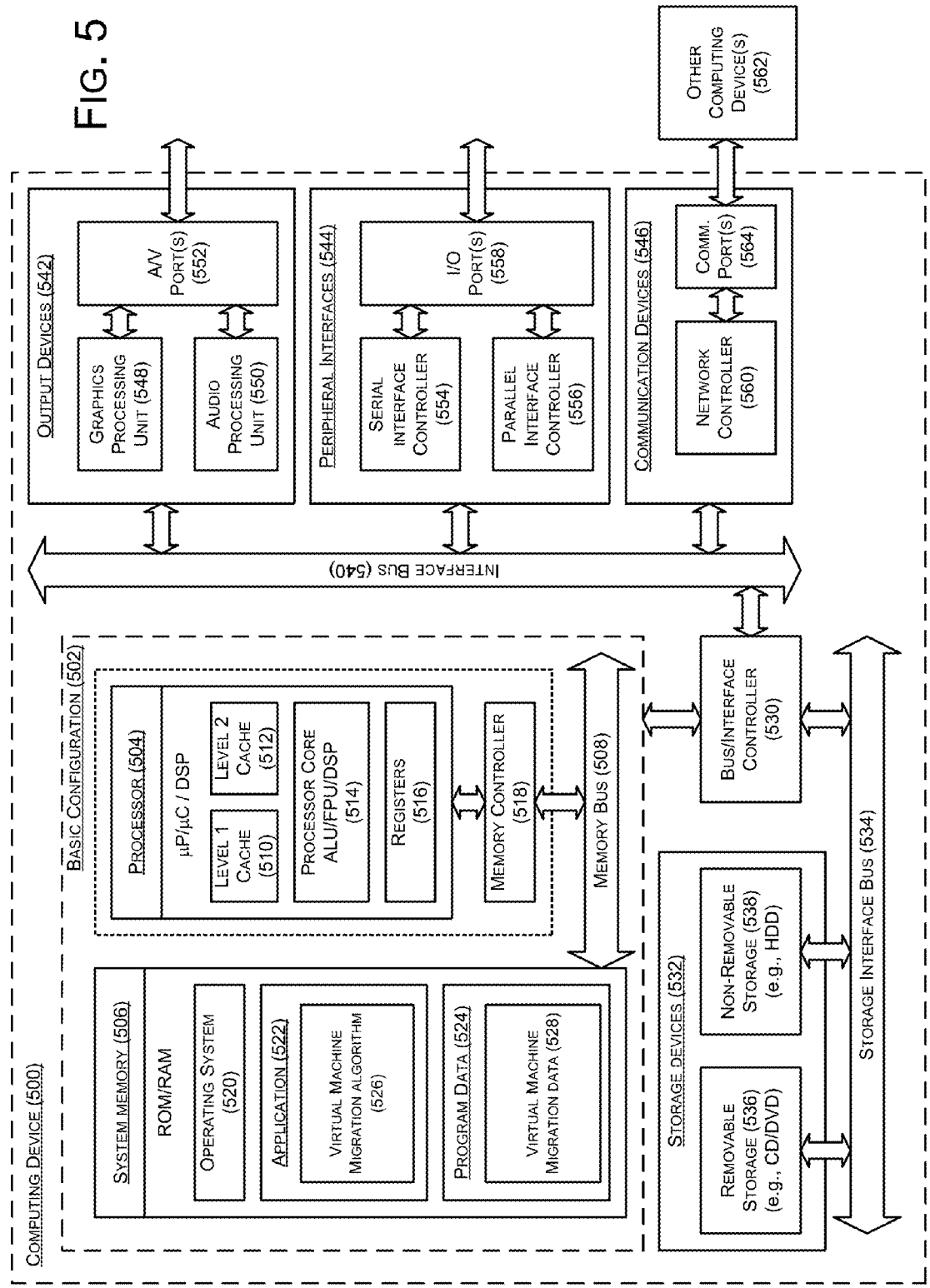

VIRTUAL MACHINE MIGRATION BASED ON COMMUNICATION FROM NODES

CROSS-REFERENCE TO RELATED APPLICATION

This Application is a U.S. National Stage filing under 35 U.S.C. §371 of PCT Application Ser. No. PCT/CN2014/079736 filed on Jun. 12, 2014. The disclosure of the PCT Application is hereby incorporated herein by reference in its entirety.

BACKGROUND

Unless otherwise indicated herein, the materials described in this section are not prior art to the claims in this application and are not admitted to be prior art by inclusion in this section.

One or more virtual machines may be executed on a host computing device. The host computing device may be effective to run a hypervisor or virtual machine manager software. The hypervisor or virtual machine manager may be effective to provide a virtual operating platform for guest virtual machines and may manage execution of the guest virtual machines. One or more client computing devices may be configured to communicate with the host computing device to access computing services under execution by the host computing device. In some examples, client computing devices may communicate with the host computing device through a network.

SUMMARY

In some examples, methods to migrate a virtual machine from a first computing device to a second computing device are generally described. In some examples, the methods may include identifying a first node configured to access the virtual machine at the first computing device. In some other examples, the methods may include determining a first vector related to the first node. The first vector may relate to a first value of a parameter, and the parameter may relate to communication between the first node and the first computing device. In various other examples, the methods may further include identifying a second node configured to access the virtual machine at the first computing device. In some examples, the methods may further include determining a second vector related to the second node. The second vector may relate to a second value of the parameter. In some cases, the parameter may further relate to communication between the second node and the first computing device. The first and second vectors may form a distribution. The methods may further include determining a feature of the distribution of the first and the second vectors. In some other examples, the methods may further include determining a first magnitude between the first computing device and the feature based on the parameter. In various examples, the methods may further include determining a second magnitude between the second computing device and the feature based on the parameter. The methods may further include migrating the virtual machine from the first computing device to the second computing device in response to a determination that the second magnitude is less than the first magnitude.

In some other examples, methods to migrate a virtual machine from a first computing device to a second computing device are generally described. In various examples, the methods may include identifying a first node configured to access the virtual machine at the first computing device. In other examples, the methods may further include determining a first vector related to the first node at a first time. The first vector may relate to a first value of a parameter. In some other examples, the parameter may relate to communication between the first node and the first computing device. In some examples, the methods may further include identifying a second node configured to access the virtual machine at the first computing device. In various other examples, the methods may further include determining a second vector related to the second node at the first time. The second vector may relate to a second value of the parameter. The parameter may further relate to communication between the second node and the first computing device. In some examples, the first and second vectors may form a first distribution. In some cases, the methods may further include determining a first feature of the first distribution of the first and the second vectors. In other examples, the methods may further include controlling the virtual machine to be executed at the first computing device based on the determination of the first feature. In some other examples, the methods may further include determining a third vector related to the first node at a second time. The third vector may relate to a third value of the parameter. The methods may further include determining a fourth vector related to the second node at the second time. The fourth vector may relate to a fourth value of the parameter. In some cases, the third and fourth vectors may form a second distribution. In some examples, the methods may further include determining a second feature of the second distribution of the third and fourth vectors. In various examples, the methods may further include migrating the virtual machine from the first computing device to the second computing device in response to a determination that the second feature does not equal the first feature.

In some examples, computing devices are generally described. In some examples, a first computing device may include a processor and a memory configured to be in communication with the processor. The memory may be effective to store an image of a virtual machine. In some examples, the memory may be further effective to store one or more instructions. In various cases, the processor may be effective to, in accordance with the instructions, control execution of the virtual machine. In some examples, the processor may be effective to, in accordance with the instructions, identify a first node effective to access the virtual machine at the first computing device. In various cases, the processor may be further effective to, in accordance with the instructions, determine a first vector related to the first node. The first vector may relate to a first value of a parameter. The parameter may relate to communication between the first node and the first computing device. In various cases, the processor may be further effective to, in accordance with the instructions, identify a second node configured to access the virtual machine at the first computing device. In some other cases, the processor may be effective to, in accordance with the instructions, determine a second vector related to the second node. The second vector may relate to a second value of the parameter. The parameter may further relate to communication between the second node and the first computing device. The first and second vectors may form a distribution. In some other examples, the processor may be effective to, in accordance with the instructions, determine a feature of the distribution of the first and the second vectors. In various cases, the processor may be effective to, in accordance with the instructions, determine a first magnitude between the first computing device and the feature based on the parameter. In other cases, the processor may be effective to, in accordance with the instructions, receive a second magnitude between a second computing device and the feature based on the parameter. In various other cases, the processor may be effective to, in accordance with the instructions, migrate the virtual machine from the first computing device to the second computing device in response to a determination that the second magnitude is less than the first magnitude.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 illustrates an example computer program product that can be utilized to implement virtual machine migration based on communication from nodes; and FIG. 5 is a block diagram illustrating an example computing device that is arranged to implement virtual machine migration based on communication from nodes; all arranged according to at least some embodiments described herein.

DETAILED DESCRIPTION

Figure 1:
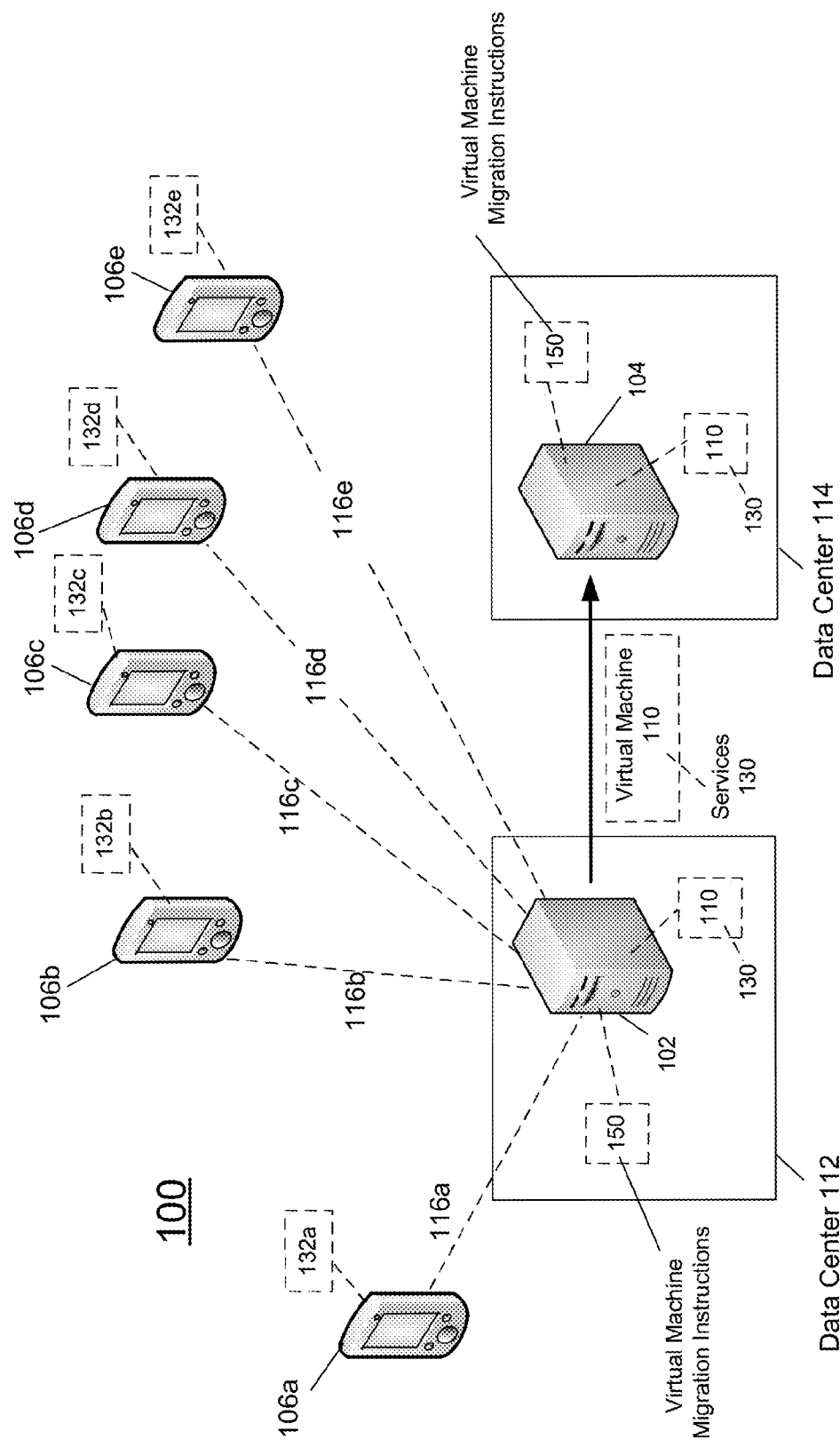
FIG. 1 illustrates an example system that can be utilized to implement virtual machine migration based on communication from nodes.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the drawings, can be arranged, substituted, combined, separated, and designed in a wide variety of different configurations.

This disclosure is generally drawn to, inter alia, methods, apparatus, systems, devices, and computer program products related to virtual machine migration based on communication from computing devices or nodes.

Briefly stated, technologies are generally described for systems, devices and methods effective to migrate a virtual machine from a first computing device to a second computing device. In some examples, a first node may be identified that is effective to access the virtual machine at the first computing device. For example, a first mobile device may be effective to access a virtual machine under execution by a first server. A first vector related to the first node may be determined. For example, a first vector which specifies or includes an indication of an angle between the first mobile device and the first server and a distance between the first mobile device and the first server may be determined. The first vector may relate to a first value of a parameter that may relate to communication of data between the first node and the first computing device. In an example, the parameter may be a latency experienced when communicating a request from the first node to a virtual machine under execution by the first server. A second node may be identified that may be configured to access the virtual machine at the first computing device. For example, a second mobile device that may be configured to access the virtual machine under execution by the first server may be identified. A second vector related to the second node may be determined. For example, a second vector which specifies or includes an indication of an angle between the second mobile device and the first server and a distance between the second mobile device and the first server may be determined. The second vector may relate to a second value of the parameter that may further relate to communication of data between the second node and the first computing device. In an example, the parameter may be a latency experienced when communicating a request from the second node to a virtual machine under execution by the first server. The first and second vectors may form a distribution of vectors related to a state of communications between the first computing device and the first and second nodes. The distribution may be a mathematical representation of current network conditions, such as data communications between a node and a server executing a virtual machine. In an example, one or more mathematical operations may be performed on the first and second vectors to characterize the first and second vectors as a distribution. A feature of the distribution of the first and the second vectors may be determined. For example, a center of gravity of the distribution may be determined. A first magnitude between the first computing device and the feature may be determined based on the parameter. In the current example, a first magnitude of a first distance between the first server and the center of gravity may be determined. A second magnitude between the second computing device and the feature may be determined based on the parameter. In the example, a second magnitude of a second distance between the second server and the center of gravity may be determined. The virtual machine may be migrated from the first computing device to the second computing device in response to a determination that the second magnitude is less than the first magnitude. For example, the virtual machine may be migrated from the first server to the second server when the distance between the second server and the center of gravity is less than the distance between the first server and the center of gravity.

FIG. 1 illustrates an example system 100 that can be utilized to implement virtual machine migration based on communication from nodes, arranged in accordance with at least some embodiments described herein. System 100 may include one or more data centers (including data centers 112 and/or 114), two or more devices 106 (including devices 106a, 106b, 106c, 106d, and/or 106e), and two or more servers (including servers 102 and/or 104). Devices 106 may be, for example, laptops, mobile phones, tablets, sensor nodes, and/or other computing devices. Data center 112 and data center 114 may be, for example, facilities effective to house computing devices, computer storage systems, and/or telecommunications systems. Server 102 and server 104 may be computing devices configured to be capable of executing one or more virtual machines. Although depicted in separate data centers, servers 102, 104 may be located in the same data center, in some examples. For example, server 102 may execute a virtual machine 110. Virtual machine 110 may be configured to deploy services 130 to one or more devices 106. Virtual machine 110 may be accessed by one or more devices 106 over one or more network paths 116 (including network paths 116a, 116b, 116c, 116d, and/or 116e). Virtual machine 110 may provide one or more services 130. Some examples of services 130 of virtual machine 110 may include execution of a guest operating system, execution of one or more programs, data storage operations, emulation of hardware of one or more physical computing devices, etc.

Devices 106 may be, for example, one or more computing devices or nodes which may be configured to access virtual machine 110. In some examples, virtual machine 110 may perform one or more computing services for devices 106. Servers 102 and/or 104 may be capable of identifying and/or communicating with devices 106 in order to determine network conditions. Devices 106 may collect data 132 (including data 132a, 132b, 132c, 132d, and/or 132e). Data 132 may include information and/or parameters related to latency, geographical distance, battery power, throughput, jitter, bandwidth, packet loss, etc. In some examples, data 132 may be related to network communications between devices 106 and servers 102 and/or 104. For example, data 132 may include information related to a geographical distance between a particular device 106 and server 102. Data 132 may be related to devices 106 and/or to a network path 116 used by devices 106 to access virtual machine 110. Network path 116 may be, for example, a pathway, which may couple two or more networked devices. Data may be transmitted from a sending device to a receiving device through network path 116. In an example, data 132 may include information related to a throughput of a particular network path 116 between a particular device 106 and server 102.

As will be discussed in further detail below, servers 102 and/or 104 may be configured to determine whether to migrate virtual machine 110 from a first computing device (such as server 102) to a second computing device (such as server 104) based on virtual machine migration instructions 150. For example, virtual machine 110 may initially be executing on server 102 of data center 112 at a time $t_0$. At a later time, $t_1$, server 104 may determine, based on data 132, that server 104 may more effectively deploy at least a portion of services 130 of virtual machine 110. Accordingly, server 102 may migrate virtual machine 110 from server 102 to server 104 at time $t_1$. In some examples, a backup image of virtual machine 110 may be stored at server 102, post migration. In an example, the backup image of virtual machine 110 may include an image of virtual machine 110 stored in a memory associated with server 102.

Figure 2:
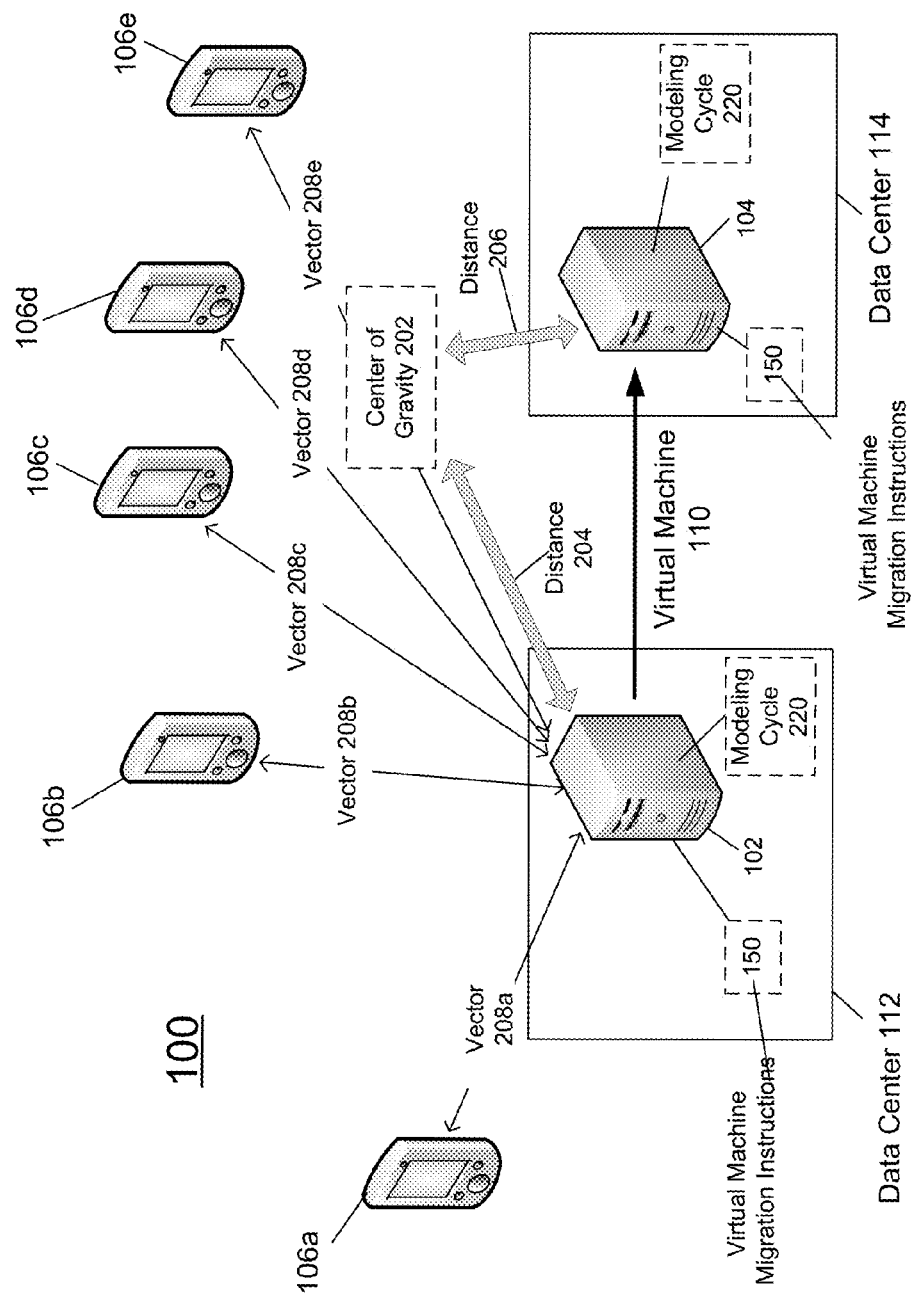
FIG. 2 depicts the example system of FIG. 1 with details relating to vector modeling of nodes.

FIG. 2 depicts the example system of FIG. 1 with details relating to vector modeling of nodes, arranged in accordance with at least some embodiments described herein. Those components in FIG. 2 that are labeled identically to components of FIG. 1 will not be described again for the purposes of clarity and brevity.

Servers 102 and/or 104 may be effective to model a network of system 100 by determining vectors 208 (including vectors 208a, 208b, 208c, 208d, and/or 208e) related to values of parameters of devices 106 based on virtual machine migration instructions 150. A model of system 100, represented by vectors 208, may relate to a state of network communications between devices 106 and servers 102 and/or 104. In an example, vectors 208 may be related to parameters which may be, in turn, related to network communications between devices 106 and servers 102, 104. In some examples, parameters may include geographical coordinates, distances, battery power, latency, throughput, etc. In an example, parameters of vectors 208 may be related to a current state of network communications between devices 106 and servers 102 and/or 104. Vectors 208 may include a magnitude and a direction. Additionally, vectors 208 may be weighted based on network conditions of system 100. For example, vectors 208 may be weighted by applying various multipliers to the magnitude of vectors 208. In some examples, the multipliers may be based on such phenomena as latency, geographical distance, battery power, throughput, jitter, bandwidth, packet loss, etc. In some examples, the phenomenon chosen to weigh vectors 208 may be different than the chosen parameter of vectors 208. For example, if vectors 208 are related to the parameter "throughput" vectors 208 may be weighted based upon jitter experienced in communications between devices 106 and servers 102 and/or 104. In another example, a particular device 106 may be experiencing latency above a threshold. Vector 208 associated with the particular device 106 may be multiplied by 0.5, based on the latency exceeding the threshold.

In an example, vectors 208 may represent a geographical distance and a direction between a device 106 and one of servers 102 and/or 104. In some examples, a distribution of vectors 208 may be determined, such as by, for example, a multivariate probability distribution. Based on vectors 208, a feature of the distribution of vectors 208 may be determined. In some examples, the feature of the distribution of vectors 208 may be located at a position within the vector space. The vector space may be, for example, a coordinate plane of vectors 208. For example, the feature may be a center of gravity 202 that may be determined by, for example, calculating an average of vectors 208 to determine a center position of vectors 208. In various examples, center of gravity 202 may be located at a defined distance from server 102 or server 104.

In an example, server 102 may determine a distance 204 that may represent a magnitude of a difference between server 102 and center of gravity 202 in the vector space. For example, if vectors 208 represent spatial distances between server 102 and devices 106, and if center of gravity 202 represents an average of vectors 208, distance 204 may represent a spatial distance between server 102 and center of gravity 202 in the vector space.

Server 104 may determine a distance 206 the vector space. Distance 206 may represent a difference between server 104 and center of gravity 202. For example, if vectors 208 represent latencies of devices 106, and if center of gravity 202 represents an average of vectors 208, distance 206 may represent a latency between server 104 and center of gravity 202. In some examples, servers 102 and/or 104 may control execution of virtual machine 110 based on distance 206 and/or distance 204.

Server 102 may migrate virtual machine 110 from server 102 to server 104 when distance 206 includes a smaller or lesser magnitude relative to a magnitude of distance 204, where both distance 204 and distance 206 relate to vectors that, in turn, relate to the same parameter. Server 104 may migrate virtual machine 110 from server 104 to server 102 when distance 204 includes a smaller magnitude relative to a magnitude of distance 206. In an example, servers 102 and 104 may periodically model system 100 in a modeling cycle 220 based on virtual machine migration instructions 150. In some examples, server 102 may migrate virtual machine 110 from server 102 to server 104 when a magnitude of distance 206 is less than a magnitude of distance 204 for a number of consecutive modeling cycles 220 or for a particular amount of time. In other examples, server 102 may migrate virtual machine 110 from server 102 to server 104 when a magnitude of distance 206 is less than a magnitude of distance 204 for a number of modeling cycles 220 that exceeds a threshold amount during a time period. In various other examples, server 102 may store a backup (and/or image) of virtual machine 110, post migration. Although two servers are depicted and described in FIG. 2, system 100 may be implemented using any number of servers. For example, virtual machine 110 may be migrated to a particular server in system 100 which includes the smallest magnitude vector between the particular server and center of gravity 202 (relative to other servers in system 100).

Among other potential benefits, virtual machine migration based on communication from nodes in accordance with the present disclosure may allow for more efficient deployment and/or provisioning of computing services. Virtual machines may be executed at servers based on current network parameters. For example, shifting physical locations of devices may prompt a virtual machine migration to allow for greater computing efficiency. Virtual machines may be positioned near particular network nodes in order to optimize a particular network.

Figure 3:
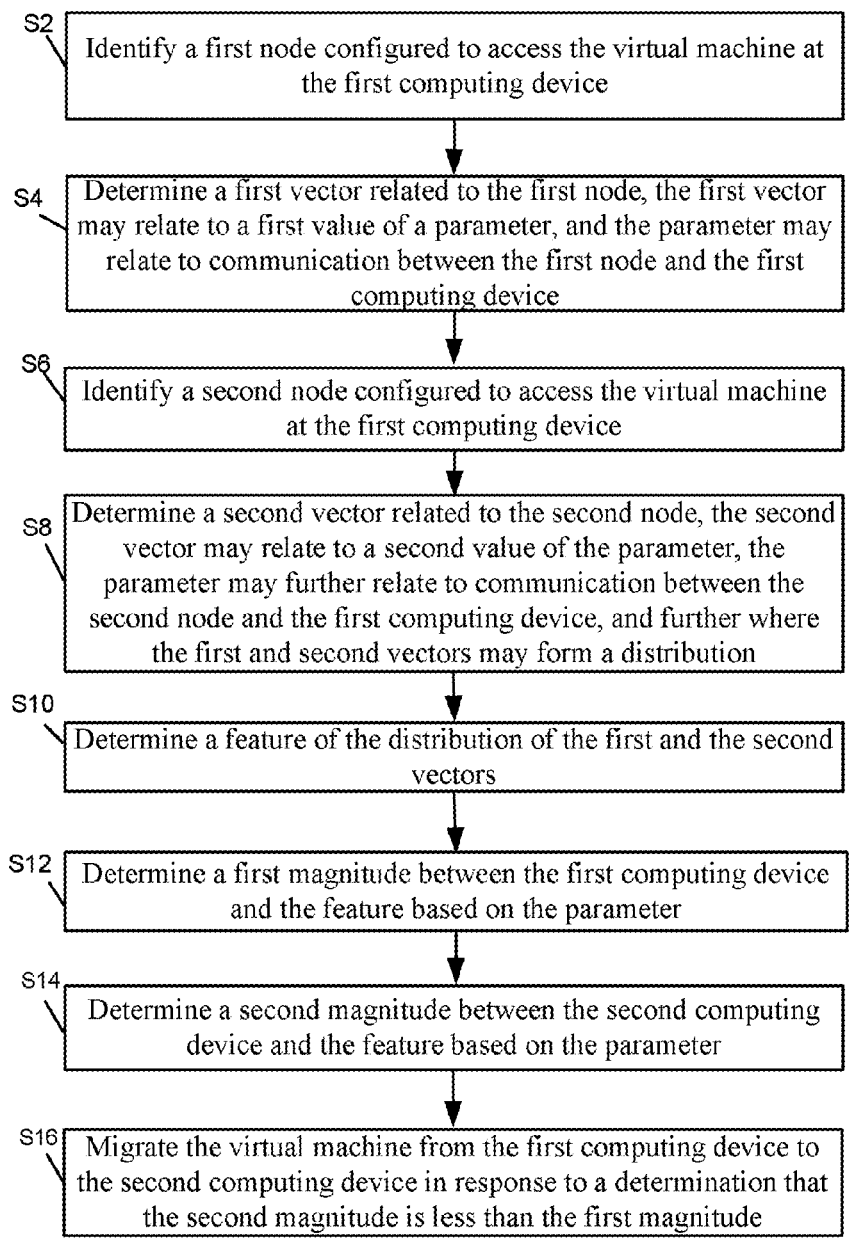
FIG. 3 depicts a flow diagram for an example process for implementing virtual machine migration based on communication from nodes.

FIG. 3 depicts a flow diagram for example process for implementing virtual machine migration based on communication from nodes, arranged in accordance with at least some embodiments described herein. In some examples, the process in FIG. 3 could be implemented using system 100 discussed above and could be used to migrate a virtual machine between computing devices. An example process may include one or more operations, actions, or functions as illustrated by one or more of blocks S2, S4, S6, S8, S10, S12, S14 and/or S16, etc. Although illustrated as discrete blocks, various blocks may be divided into additional blocks, combined into fewer blocks, or eliminated, depending on the particular implementation. Blocks may be supplemented with additional blocks representing other operations, actions, or functions. The process in FIG. 3 may be used by a server configured in communication with one or more devices, such as devices 106, as described above. The servers 102 and/or 104 may include a processor and a memory. The memory may be configured to store one or more instructions which may be executing on by the processor to implement virtual machine migration based on devices. The memory may be further effective to store and/or retain one or more images of virtual machines, such as virtual machine 110.

Processing may begin at block S2, "Identify a first node configured to access the virtual machine at the first computing device." At block S2, a first node may be identified. The first node may be configured to access a virtual machine (e.g., virtual machine 110 from FIG. 1) at the first computing device.

Processing may continue from block S2 to block S4, "Determine a first vector related to the first node, the first vector may relate to a first value of a parameter, and the parameter may relate to communication between the first node and the first computing device." At block S4, a first vector (e.g., vector 208 from FIG. 2) related to the first node may be determined. The first vector may relate to a first value of a parameter, and the parameter may relate to communication between the first node and the first computing device.

Processing may continue from block S4 to block S6, "Identify a second node configured to access the virtual machine at the first computing device." At block S6, a second node may be identified. The second node may be configured to access the virtual machine at the first computing device.

Processing may continue from block S6 to block S8, "Determine a second vector related to the second node, the second vector may relate to a second value of the parameter, the parameter may further relate to communication between the second node and the first computing device, and further where the first and second vectors may form a distribution." At block S8, a second vector related to the second node may be determined. The second vector may relate to a second value of the parameter. The parameter may further relate to communication between the second node and the first computing device. The first and second vectors may form a distribution. The first vector may relate to a first distance between the first node and the first computing device. The second vector may relate to a second distance between the second node and the first computing device.

Processing may continue from block S8 to block S10, "Determine a feature of the distribution of the first and the second vectors." At block S10, a feature of the distribution of the first and the second vectors may be determined. For example, center of gravity 202 from FIG. 2 may be determined as a feature of the distribution. The center of gravity may be determined by averaging at least the first and second vectors. In some other examples, the feature of the distribution may be located at a position within the vector space.

Processing may continue from block S10 to block S12, "Determine a first magnitude between the first computing device and the feature based on the parameter." At block S12, a first magnitude between the first computing device and the feature may be determined, based on the parameter. For example, distance 204 and/or 206 may be determined as a first magnitude between the first computing device and center of gravity 202. The first magnitude may relate to a first distance between the first computing device and the feature.

Processing may continue from block S12 to block S14, "Determine a second magnitude between the second computing device and the feature based on the parameter." At block S14, a second magnitude between the second computing device and the feature may be determined, based on the parameter. The second magnitude may relate to a second distance between the second computing device and the feature. The parameters may include at least one of geographical coordinates, battery power, latency, throughput, jitter, bandwidth, and/or packet loss.

Processing may continue from block S14 to block S16, "Migrate the virtual machine from the first computing device to the second computing device in response to a determination that the second magnitude is less than the first magnitude." At block S16, the virtual machine (e.g., virtual machine 110 from FIG. 1) may be migrated from the first computing device (e.g., server 102 from FIG. 1) to the second computing device (e.g., server 104 from FIG. 1) in response to a determination that the second magnitude is less than the first magnitude. Migrating the virtual machine from the first computing device to the second computing device may be further based on determining whether the second magnitude has been less than the first magnitude for a particular amount of time. A backup image of the virtual machine (such as, for example, virtual machine 110) may be retained at the first computing device, prior to the migration.

Migrating the virtual machine from the first computing device to the second computing device may be further based on determining whether the second magnitude is less than the first magnitude by a threshold amount.

FIG. 4 illustrates an example computer program product 400 that can be utilized to implement virtual machine migration based on communication from nodes, arranged in accordance with at least some embodiments described herein. Computer program product 400 may include a signal bearing medium 402. Signal bearing medium 402 may include one or more instructions 404 that, in response to execution by, for example, a processor, may provide the functionality and features described above with respect to FIGS. 1-3. Thus, for example, referring to system 100, server 102 and/or server 104 may undertake one or more of the blocks shown in FIG. 4 in response to instructions 404 conveyed to system 100 by signal bearing medium 402.

In some implementations, signal bearing medium 402 may encompass a computer-readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, computer program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

FIG. 5 is a block diagram illustrating an example computing device 500 that is arranged to implement virtual machine migration based on communication from nodes, arranged in accordance with at least some embodiments described herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include virtual machine migration algorithm 526 that is arranged to perform the functions and operations as described herein including those described with respect to FIGS. 1-4 in connection with system 100. Program data 524 may include virtual machine migration data 528 that may be useful to implement virtual machine migration based on communication from nodes as is described herein. In some embodiments, application 522 may be arranged to operate in cooperation with program data 524 and/or operating system 520 such that virtual machine migration based on communication from nodes may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDDs), optical disk drives such as compact disk (CD) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to migrate a virtual machine from a first computing device to a second computing device, the method comprising:
    identifying a first node configured to access the virtual machine at the first computing device;
    determining a first vector related to the first node, wherein the first vector relates to a first value of a parameter, and the parameter relates to communication between the first node and the first computing device;
    identifying a second node configured to access the virtual machine at the first computing device;
    determining a second vector related to the second node, wherein the second vector relates to a second value of the parameter, the parameter further relates to communication between the second node and the first computing device, and further wherein the first and second vectors form a distribution;
    determining a feature of the distribution of the first and the second vectors;

determining a first magnitude between the first computing device and the feature based on the parameter;
determining a second magnitude between the second computing device and the feature based on the parameter; and
migrating the virtual machine from the first computing device to the second computing device in response to a determination that the second magnitude is less than the first magnitude.

2. The method of claim 1, wherein the first vector further relates to a first distance between the first node and the first computing device; and
wherein the second vector further relates to a second distance between the second node and the first computing device.

3. The method of claim 1, wherein the first magnitude relates to a first distance between the first computing device and the feature; and
wherein the second magnitude relates to a second distance between the second computing device and the feature.

4. The method of claim 1, wherein migrating the virtual machine from the first computing device to the second computing device is further based on determining whether the second magnitude has been less than the first magnitude for a particular amount of time.

5. The method of claim 1, wherein the parameters include at least one of geographical coordinates, battery power, latency, throughput, jitter, bandwidth and packet loss.

6. The method of claim 1, further comprising retaining a backup image of the virtual machine at the first computing device, prior to the migration.

7. The method of claim 1, wherein the feature of the distribution is a center of gravity; and
further comprising averaging at least the first and second vectors to determine the center of gravity.

8. The method of claim 1, wherein migrating the virtual machine from the first computing device to the second computing device is further based on determining whether the second magnitude is less than the first magnitude by a threshold amount.

9. A method to migrate a virtual machine from a first computing device to a second computing device, the method comprising:
identifying a first node configured to access the virtual machine at the first computing device;
determining a first vector related to the first node at a first time, wherein the first vector relates to a first value of a parameter, and the parameter relates to communication between the first node and the first computing device;
identifying a second node configured to access the virtual machine at the first computing device;
determining a second vector related to the second node at the first time, wherein the second vector relates to a second value of the parameter, the parameter further relates to communication between the second node and the first computing device, and further wherein the first and second vectors form a first distribution;
determining a first feature of the first distribution of the first and the second vectors;
controlling the virtual machine to be executed at the first computing device based on the determination of the first feature;
determining a third vector related to the first node at a second time, wherein the third vector relates to a third value of the parameter;
determining a fourth vector related to the second node at the second time, wherein the fourth vector relates to a fourth value of the parameter, and further wherein the third and fourth vectors form a second distribution;
determining a second feature of the second distribution of the third and fourth vectors; and
migrating the virtual machine from the first computing device to the second computing device in response to a determination that the second feature does not equal the first feature.

10. The method of claim 9, wherein migrating the virtual machine from the first computing device to the second computing device is based on a first magnitude exceeding a second magnitude;
wherein the first magnitude relates to a distance between the first computing device and the second feature, and wherein the second magnitude relates to a distance between the second computing device and the second feature.

11. The method of claim 9, wherein migrating the virtual machine from the first computing device to the second computing device is based on a first magnitude exceeding a second magnitude for a particular amount of time;
wherein the first magnitude relates to a distance between the first computing device and the second feature, and wherein the second magnitude relates to a distance between the second computing device and the second feature.

12. The method of claim 9, wherein the first feature of the first distribution includes a first center of gravity of the first distribution, and wherein the second feature of the second distribution includes a second center of gravity of the second distribution.

13. The method of claim 9, wherein the first feature of the first distribution is located at a position within a vector space.

14. The method of claim 9, further comprising retaining a backup image of the virtual machine at the first computing device, prior to the migration.

15. The method of claim 9, wherein migrating the virtual machine from the first computing device to the second computing device is based on a first magnitude exceeding a second magnitude by a threshold amount;
wherein the first magnitude relates to a distance between the first computing device and the first feature, and wherein the second magnitude relates to a distance between the second computing device and the second feature.

16. A first computing device comprising:
a processor; and
a memory configured to be in communication with the processor, the memory effective to:
store an image of a virtual machine; and
store one or more instructions;
the processor effective to, in accordance with the instructions:
control execution of the virtual machine;
identify a first node configured to access the virtual machine at the first computing device;
determine a first vector related to the first node, wherein the first vector relates to a first value of a parameter, and the parameter relates to communication between the first node and the first computing device;
identify a second node configured to access the virtual machine at the first computing device;
determine a second vector related to the second node, wherein the second vector relates to a second value of the parameter, the parameter further relates to communication between the second node and the first computing device, and further wherein the first and second vectors form a distribution;

determine a feature of the distribution of the first and the second vectors;

determine a first magnitude between the first computing device and the feature based on the parameter;

receive a second magnitude between a second computing device and the feature based on the parameter; and migrate the virtual machine from the first computing device to the second computing device in response to a determination that the second magnitude is less than the first magnitude.

17. The first computing device of claim 16, wherein the feature of distribution is a center of gravity, and wherein the processor is effective to calculate an average of at least the first and second vectors to determine the center of gravity, based on the instructions.

18. The first computing device of claim 16, wherein to migrate the virtual machine from the first computing device to the second computing device, the processor is further effective to determine, based on the instructions, whether the second magnitude has been less than the first magnitude for a particular amount of time.

19. The first computing device of claim 16, wherein the first magnitude relates to a first distance between the first computing device and the feature; and wherein the second magnitude relates to a second distance between the second computing device and the feature.

20. The first computing device of claim 16, wherein the parameters include at least one of geographical coordinates, latency, throughput, jitter, bandwidth and packet loss.

* * * * *